Oct. 16, 1928.

A. WHITTAKER 1,688,168

WALL TYPE ELECTRIC HEATER

Filed Oct. 9, 1925   2 Sheets-Sheet 1

Inventor:
Arthur Whittaker
By
Attorneys.

Oct. 16, 1928.

A. WHITTAKER 1,688,168

WALL TYPE ELECTRIC HEATER

Filed Oct. 9, 1925  2 Sheets-Sheet 2

Inventor:
Arthur Whittaker
By
Attorneys.

Patented Oct. 16, 1928.

1,688,168

UNITED STATES PATENT OFFICE.

ARTHUR WHITTAKER, OF WINDSOR, ONTARIO, CANADA.

WALL-TYPE ELECTRIC HEATER.

Application filed October 9, 1925. Serial No 61,429.

This invention relates to an electric heater and more particularly to a wall type of such heaters.

An object of the invention is to provide a construction which is such as to preclude danger from fire due to short circuit or overheating of the building wall in which the heater is mounted and further, to provide a simple and efficient arrangement of casing and reflector whereby air circulation is secured and the maximum heating efficiency obtained. It is also an object to provide a heating element of simple construction and efficient operation and to so mount the same as to be readily removable for replacement and repair.

A further object is to provide a heater the construction of which is such as to facilitate its installation in the wall of a building and when so installed presents a very neat and attractive appearance, and which embodies other new and useful features in the construction and arrangement of parts, all as will hereinafter more fully appear.

With the above and other ends in view, the invention consists in the matters hereinafter set forth and more particularly pointed out in the appended claims, reference being had to the accompanying drawings, in which Figure 1 is a front elevation of a heater illustrative of the present invention, and showing portions of the cover plate or grating broken away and removed to more clearly show the construction;

Figure 1:
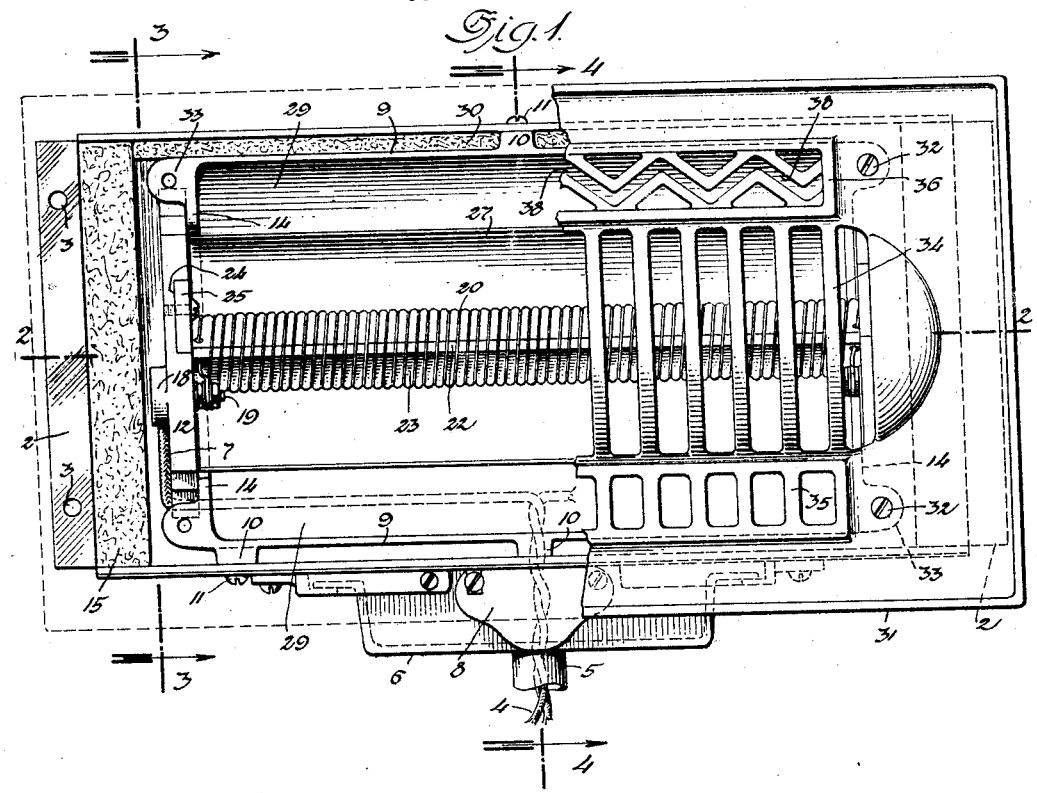
Figure 2:
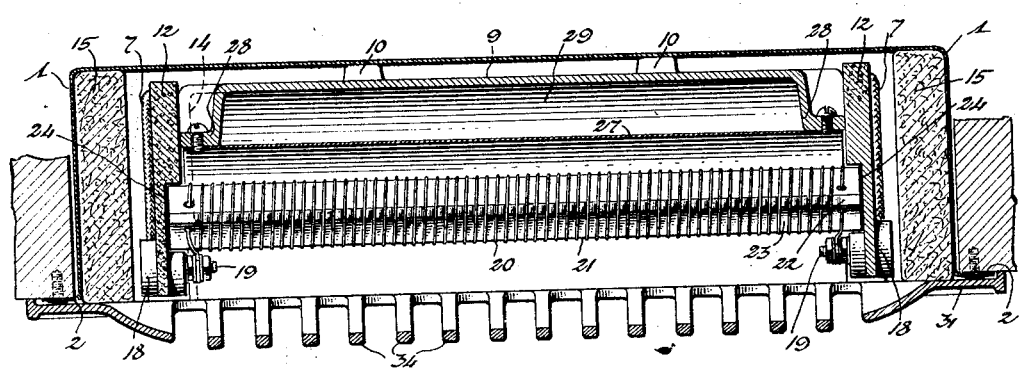
Fig. 2 is a central, longitudinal, horizontal section substantially upon the line 2—2 of Fig. 1.

As shown in the drawings, 1 indicates a suitable sheet metal box or casing, open at its front side and provided with end flanges 2 by means of which the box may be secured in place within an opening in the wall of a building with the heater parts in place within this box and with said flanges overlying the outer surface of the wall and firmly secured thereto by screws passing through openings 3 in said flanges, so that the plane of the open front of the box will lie substantially flush with the wall surface. This box 1 thus forms a metal casing tightly enclosing the heater parts within the wall with the front side of the box opening through the face of the wall, and to protect the leading-in wires 4 of the house circuit, the usual conduit 5 for such wires is attached to an outlet box 6, detachably attached to the lower or bottom wall of the box 1, within the wall of the building. It is within this outlet box that the wires are spliced to the wires 7 leading to the opposite ends of the box therein and connected to the opposite ends of a heating element hereinafter described. At its front side, this outlet box is provided with an opening closed by a plate 8 which is pivoted to the bore to be swung from over the opening to give access to the interior of the box for the purpose of splicing the wires after the heater is in place within the wall of the building and for the purpose of inspecting such wiring. The heater may be completely assembled and wired ready for installation and then conveniently connected in the house circuit after installation in the wall of the building.

Within the box 1 is a cast metal casing 9 of concave formation, this casing being open at its front side at the front of the box and having open ends. This casing is also formed with outwardly projecting lugs engaging the inner surface of the top, bottom and back wall of the box 1 to space said casing from these walls and form points of support for the casing within the box, the casing being secured in the box by screws 11 passing through the box walls into these lugs. This casing which is semi-circular in cross-section or concavo-convex is thus rigidly supported in the box in spaced relation thereto.

Figure 3:
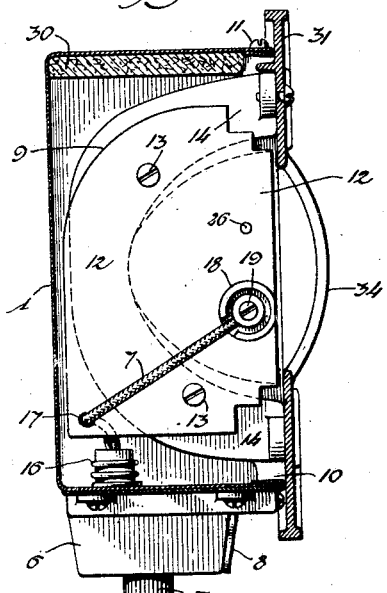
Fig. 3 is a transverse vertical section upon the line 3—3 of Fig. 1.

To close the open ends of this casing 9, blocks 12 formed of suitable insulating material are provided, these blocks being secured to the ends of the casing by means of screws 13 passing through the blocks and into end flanges 14 extending inwardly of the casing at the ends thereof. The casing 9 is of considerably less length than the box 1 so that there is a considerable space at each end of the casing between the blocks 12 and the end walls of the box, and to further insure complete electrical insulation between the casing and box and for the wiring and electrical connections, thick blocks 15 of insulating material are fitted within the ends of the box 1 with sufficient space between the inner face of these blocks and the blocks 12, for the wires 7 which are covered with insulation but are further protected against short circuit by being led into the space between the bottom wall of the box and casing, from the outlet box 6, through a suitable insulator 16, then carried along to the ends of the casing and supported out of contact with said casing and box wall by being passed through openings 17 (see Fig. 3) in the blocks 12 and thence upward upon the outer face of said blocks to suitable insulators 18 each carrying a terminal post 19 to which posts the ends of the bare wire 20 forming the resistance wire of the heating element are connected.

Figure 4:
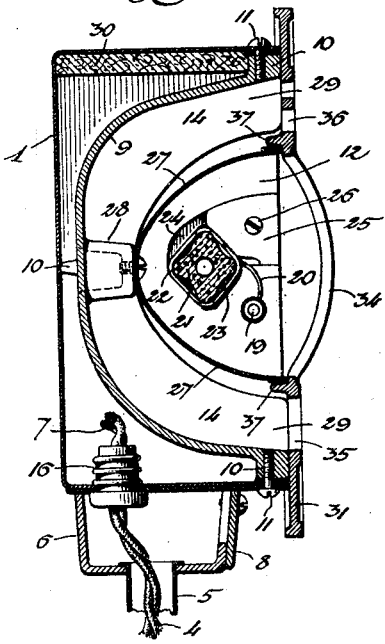
Fig. 4 is a similar section upon the line 4—4 of Fig. 1.
Figure 5:
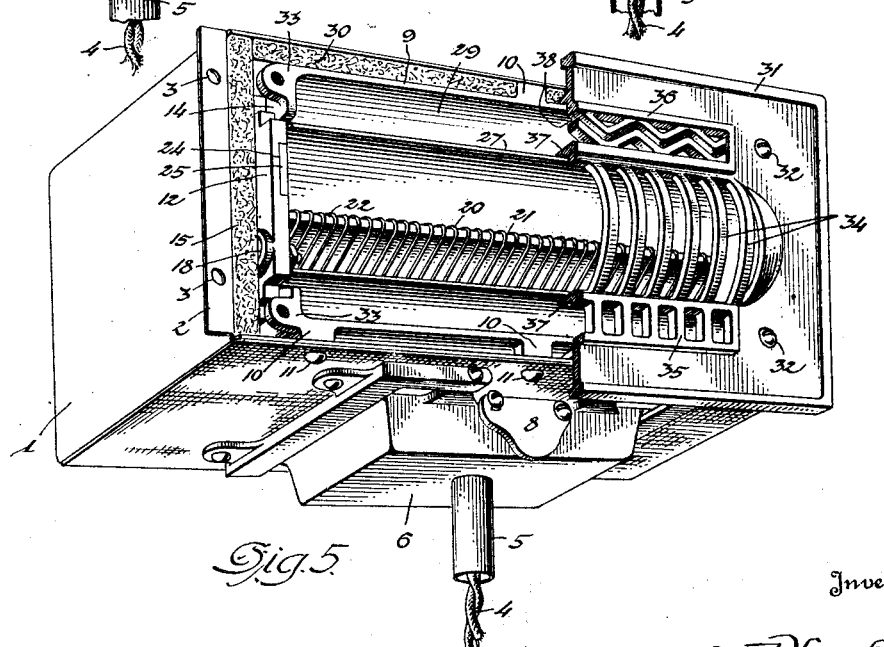
Fig. 5 is a perspective view showing the front grating in section and partly removed as in Fig. 1, said view also showing the lower side of the box or casing and outlet box thereon.

The heating element comprises a bar 21 formed of a suitable insulating material having high heat resistance and electrical insulating qualities, and this bar is preferably of rectangular form in cross-section with each corner in the form of a rib 22 with the sides of the bar between the corners, concaved slightly as shown at 23 in Fig. 4. This bar is also preferably formed hollow and its ribs 22 are provided with notches to receive the wire 20 which is wound spirally around the bar and holds the turns of the wire in spaced apart relation. The notches are all formed spirally or successively along a spiral path so that the wire may be wound upon the bar with its turns following a true spiral and lying within these notches. This facilitates manufacture as the wire may thus be wound upon the bar by means of a lathe or other suitable machine.

This heating element comprising the bar 21 and wire 20 wound thereon is supported within the casing 9 by the insulating blocks 12, each block being formed with a recess 24 in its inner face, which recess is extended through the outer edge of the block so that the ends of the bar 21 may be set into these recesses through their open outer ends to rest at the inner ends thereof, and to hold the bar in place. Filler blocks 25 formed by insulating material are secured by screws 26 in the outer ends of said recesses to close said ends and prevent movement of the bar. The element is thus securely held in place upon the insulating blocks and may be quickly and easily removed for replacement or repair through the open side of the casing and without the necessity for demounting the structure from the wall of the building, by simply detaching the filler blocks 25 and lifting the bar out of the open ends of the recesses.

Within the casing 9 is supported a concavo-convex reflector 27 with its edges substantially in the plane of the open front of the box 1 and casing 9 and its reflecting wall between the heating element and casing, by means of bosses 28 on the casing at the ends thereof extending inwardly of the casing and thus a space is provided between the reflector and casing forming an air flue 29 which is open at its lower side at the front of the casing below the reflector which surrounds the heating element except at the front of the casing, and is open at its upper side through the front of the casing above the reflector. The heat of the element is therefore reflected outwardly through the front of the casing by the reflector and as this reflector is preferably formed of thin sheet metal, the air in the flue 29 at the back of it is heated and passes out through its open upper end at the front of the casing. A flow of air is thus set up through the flue, cold air entering at its lower side through the casing front and being heated as it comes in contact with the hot reflector and passing out through its open upper side and into the room. This air flow not only greatly assists in rapidly heating the air in the room but also prevents over-heating of the casing and adjacent parts of the room wall in which the heater is mounted. If found desirable, further protection against overheating of the room wall above the heater, may be afforded by inserting a strip of insulating material 30 between the upper side of the casing 9 and the upper wall of the box 1.

To protect the heating element against injury, from a shield therefor, and a closure and finish for the front side of the box 1 and casing 9, a wall plate 31 is detachably secured against the face of the room wall by means of screws 32 engaging screw-threaded openings in ears 33 on the ends of the casing 9, and this wall plate is formed with a grating 34 extending across the open front side of the reflector 27, a grating 35 over the open lower side of the air flue 29, and a grating 36 over the open upper side of said flue. Heat from the heating element and reflector may therefore pass freely out into the room through the grating 34 and air may enter the lower side of the flue through the grating 35 and pass freely out through the grating 36. These gratings are formed integral with the wall plate, the grating 34 preferably comprising outwardly curved vertical bars spaced apart with their ends formed integral with longitudinal ribs 37 which engage over the longitudinal edges of the reflector 27 and assist in holding the same in place, but the grating may have any other desired form or design. The grating 36 is preferably so designed as to provide a space 38 between the rib 37 and the plate body above the outlet of the flue 29, that is there is no metallic connection between the rib at the lower side of the outlet and that portion of the plate which lies above the outlet and therefore the high heat absorbed by the grating bars 34 cannot pass by conduction into the upper part of the plate and overheat the same to such an extent as to set fire to the room wall.

With this construction, the entire structure may be made, assembled and wired, ready for installation in a wall, and may be very conveniently installed without great expense. Further, the construction is such that repairs may be readily made, and the device is very attractive in appearance and efficient in operation.

Obviously changes may be made in the construction and arrangement as shown and within the scope of the appended claims, without departing from the spirit of the invention.

Having thus fully described my invention, what I claim is:—

1. An electric wall heater comprising a box adapted to be secured within an opening in a wall of a building with an open front side of the box substantially flush with the face of said wall, a casing supported within said box, a reflector supported within said casing with a space between said casing and reflector forming an air flue open at the open side of the casing above and below said reflector, a heating element within the casing arranged centrally within said reflector and in spaced relation thereto, and a wall plate formed with a grating covering the open front side of the reflector and casing.

2. In an electric heater, in combination with a casing and a heating element in said casing, of blocks formed of insulating material with recesses cut inwardly of the confronting inner faces of said blocks to receive and support the ends of said heating element with said ends engaging and covered by the outer portions of the walls forming the bottoms of said recesses, and means on said blocks for detachably holding said element in place with its ends in said recesses.

3. In an electric heater, the combination with a casing open at one side and a heating element in said casing comprising a bar of insulating material and a resistance wire carried thereby, of insulating blocks in said casing and formed with recesses in the confronting faces of said blocks with said recesses extending through the forward edges of the blocks at the open side of the casing to receive the ends of said bar of the heating element, and means detachably secured within the said recesses to close the open ends thereof at the forward edges of the blocks and detachably hold the ends of the bar therein.

4. An electric wall heater including a box adapted to be secured within an opening in a wall of a building with an open side of the box substantially flush with the face of the wall, a casing of concavo-convex formation in cross-section secured in said box with its concave side open at the open side of said box, a reflector of concavo-convex form in cross-section supported in said casing with a space between said reflector and casing walls forming an air flue extending around the back of the reflector with the upper and lower ends of said flue open at the open front of the casing above and below said reflector, insulating blocks at the ends of said casing, an electric heating device supported at its ends upon said blocks and extending within said reflector in spaced relation thereto, and a wall plate to cover the open side of the box and casing and formed with a grating to permit heat from the heating device to escape and to permit air to flow into the lower part of said air flue below the reflector and pass out at the upper part thereof above the reflector.

5. An electric wall heater including a rectangular sheet metal box adapted to be secured in an opening in a wall of a building with an open side of the box substantially flush with the surface of the wall, a casing extending lengthwise of the box and of concavo-convex form in cross section with its concave side opening at the open side of the box, a reflector within said casing extending longitudinally thereof and of concavo-convex form in cross-section with its concavo-convex wall spaced from the concavo-convex wall of the casing to form an air flue open at the front of the casing above and below said reflector, insulating blocks forming the ends of the casing, a heating device comprising an insulating bar and a resistance wire wound thereon, said bar being detachably engaged and supported at its ends by said blocks, said blocks being formed to receive the ends of said bar and permit the ready removal thereof from engagement with the blocks through the open front side of the reflector, an outlet box on the lower side of the said box, and electrical conductors in said outlet box and extending within the first mentioned box through openings in said insulating blocks to the ends of said heating device and electrically connected to the resistance wire of said device.

6. An electric wall heater including a wall box adapted to be secured within an opening in a wall of a building with an open side of said box substantially flush with the face of said wall, an outlet box detachably secured to the lower side of said wall box and having an opening in its forward side, a movable plate for closing said opening, an electrical heating device supported in said wall box, electrical conductors extending from said device into said outlet box, and main electrical conductors extending into said outlet box and connected therein to the conductors leading to the heating device, whereby the heater may be set as a unit in the wall of a building and the electrical connection with the wiring of the building then made through the opening in the forward side of the outlet box.

In testimony whereof I affix my signature.

ARTHUR WHITTAKER.